(12) United States Patent
Davis (10) Patent No.: US 8,092,752 B2
(45) Date of Patent: Jan. 10, 2012

(54) APPARATUS AND METHOD FOR OIL AND FAT EXTRACTION

(75) Inventor: John Henry Davis, Woodston, KS (US)

(73) Assignee: TriStar Products AG (CH)

( * ) Notice: Subject to any disclaimer, the term of this patent is extended or adjusted under 35 U.S.C. 154(b) by 456 days.

(21) Appl. No.: 12/362,143

(22) Filed: Jan. 29, 2009

(65) Prior Publication Data

US 2010/0191007 A1 Jul. 29, 2010

(51) Int. Cl.
*B01J 19/00* (2006.01)
(52) U.S. Cl. .................. 422/198; 422/105; 422/129
(58) Field of Classification Search .............. 422/105, 422/129, 198
See application file for complete search history.

(56) References Cited

U.S. PATENT DOCUMENTS

| | | | | |
|---|---|---|---|---|
| 5,516,923 | A * | 5/1996 | Hebert et al. | 554/12 |
| 6,111,119 | A * | 8/2000 | Trout | 554/16 |
| 7,002,029 | B2 | 2/2006 | Davis | |
| 2004/0147769 | A1 | 7/2004 | Davis | |
| 2005/0070218 | A1* | 3/2005 | Phillips et al. | 452/122 |
| 2007/0007168 | A1* | 1/2007 | Zhao et al. | 208/45 |

FOREIGN PATENT DOCUMENTS

| | | |
|---|---|---|
| AU | 2002219448 | 7/2003 |
| CA | 2472905 | 7/2003 |
| CN | 1612771 | 5/2005 |
| CN | 1298408 C | 2/2007 |
| MX | PA04005799 | 3/2005 |
| WO | WO 03/057342 | 7/2003 |

* cited by examiner

*Primary Examiner* — Deborah D Carr
(74) *Attorney, Agent, or Firm* — Hovey Williams LLP (57) ABSTRACT

An apparatus and method for extracting oils and fats from oil-bearing substances without using degrading temperatures. The apparatus may comprise an extraction chamber containing an oil-bearing substance, an oil-collecting chamber, a recovery pump, a first jacket adjacent at least a portion of the extraction chamber, and a second jacket adjacent at least a portion of the oil-collecting chamber. The method involves heating a solvent and reducing pressure to facilitate a low-temperature vacuum boil; delivering the heated solvent into the extraction chamber configured to facilitate the low-temperature vacuum boil of the solvent within the extraction chamber; pumping the solvent in vapor form out of the extraction chamber with the recovery pump; delivering the oil and fat extracted in the extraction chamber to the oil-collecting chamber; pumping solvent in vapor form out of the oil-collecting chamber with the recovery pump; and delivering the solvent received by the recovery pump to the first and second jackets to provide heat to the chambers.

15 Claims, 7 Drawing Sheets

APPARATUS AND METHOD FOR OIL AND FAT EXTRACTION

BACKGROUND

1. Field

The present invention relates to an apparatus and method for extracting oils and fats with the use of a solvent. More particularly, the present invention relates to extracting oils and fats from oil-bearing substances without exposing the substances, oils, or fats to degrading temperatures.

2. Related Art

Most materials, whether synthetic or naturally occurring, contain some amount of oils and fats. These oils and fats, when extracted from the material, often have useful properties that can be utilized for a range of purposes. For example, oil extracted from corn may be used for cooking or as a source of biodiesel, while the fat extracted from various naturally occurring substances may be used in cosmetics such as lipstick.

Various solvents may be used to extract oils and fats from oil-bearing substances. Some processes use carbon dioxide in a super critical phase for extraction of oils from various natural products. However, due to the expense of carbon dioxide extraction, it is typically only used for expensive items or in high volume production, such as pharmaceuticals and instant coffee.

Other commonly used solvents for oil extraction are hydrocarbons such as butane, isobutane, and propane, for example, as described in U.S. Pat. Nos. 1,802,533; 2,254,245; 5,1041,245; 5,980,964; and 6,225,483.

In the extraction processes described in the aforementioned publications, raw material is bathed or wetted with solvent for a sufficiently long time to allow the oils and fats to dissolve in the solvent, or to form a miscella floating on the solvent, the solvent subsequently being removed by heating and/or by means of a vacuum to boil off the solvent. The heating of the extracted solvent and oil mixture is disadvantageous since it destroys some of the qualities of the extracted oil, affecting for example its flavor, olfactory profile, vitamin content, and other heat-sensitive components.

Extraction processes as described in U.S. Pat. Nos. 2,254,245; 5,980,964; and 6,225,483 suggest the use of cold solvents for extraction. The cold solvent however, or raw material, is chilled by a cooling system, which is energy intensive and therefore fairly costly to operate.

A further disadvantage of known extraction processes is that they use large quantities of solvent. Process times are relatively high because of the need to bathe the raw material in the solvent for a lengthy period of time, compounded by the need to subsequently remove the solvent from the extracted oils and fats. It is also difficult with known extraction methods to obtain very high yields of oils from raw materials without multiple extraction passes. Besides the time and expense, subjecting material to multiple extraction runs adversely affects the qualities of the extracted oil, the yield, and the olfactory profile of the oils. This is undesirable particularly for any substance with low oil content that is considered to be relatively rare.

One known extraction process described in U.S. Pat. No. 7,002,029 uses adiabatic cooling to extract oils from raw materials using a minimal amount of solvent. However, this process has the disadvantage of significantly cooling the material, which may alter the properties of the material and its oil or fat. Additionally, this can cause material to freeze-up in the oil-collecting chamber during the extraction process.

Accordingly, there is a need for an improved extraction of oil and fats from oil-bearing substances that does not suffer from the problems and limitations of the prior art.

SUMMARY

The present invention provides an apparatus and method for extracting oils and fats from oil-bearing substances without the use of degrading temperatures that may damage or destroy the supercritical turpines within the oil and/or fat extracted. An apparatus constructed in accordance with an embodiment of the invention may comprise an extraction chamber for containing an oil-bearing substance, an oil-collecting chamber, a recovery pump, a first jacket adjacent at least a portion of the extraction chamber, and a second jacket adjacent at least a portion of the oil-collecting chamber. The apparatus may further comprise a heat exchanger to heat a solvent (such as a compressed gas), a solvent storage tank, a plurality of filters, and a plurality of pipes or conduits for transferring solvent, fat, and/or oil to and from various components of the apparatus.

The apparatus may be air-tight and vacuumed to remove at least a portion of the atmosphere therein prior to operation. The solvent in compressed liquid form from the solvent storage tank may be heated by the heat exchanger to approximately the boiling point of the solvent and pumped into the extraction chamber to dissolve oil and fat from the oil-bearing substance. The temperature of the solvent and a low pressure within the extraction chamber may cause the solvent to boil within the extraction chamber, thereby mixing the oil-bearing substance and exposing different faces of the substance to the solvent such that the oil and/or fat may be dissolved more quickly than in prior art methods. This boiling in the extraction chamber may be referred to herein as a low-temperature vacuum boil.

The low-temperature vacuum boil of the solvent allows the solvent, in vapor form, to be pumped out of a top portion of the extraction chamber and the oil-collecting chamber by the recovery pump, while the heavier oil and fat fall into the oil-collecting chamber. The recovery pump simultaneously lowers the pressure within the extraction chamber and oil-collecting chamber, facilitating the low-temperature vacuum boil described above. Additionally, the solvent vapor received by the recovery pump may be heated by the pressure applied to it by the recovery pump and may then be pumped out into the first and second jackets, which are configured to provide the heat from the solvent each jacket receives to the extraction chamber and oil-collecting chamber. Therefore, the jackets may assist in maintaining the heat for the low-temperature vacuum boil of the solvent inside of the chambers, even as a portion of the heated solvent vapor inside of the chambers is continuously pumped out of the chambers. Therefore, heat created as a bi-product of operating the recovery pump is recycled by being delivered to the jackets, thereby allowing the apparatus to self-regulate the heating of the extraction and oil-collecting chambers.

A method in accordance with an embodiment of the invention involves heating a solvent to a temperature that may facility low-temperature vacuum boiling but will not cause degradation in the quality of the oils and/or fats being extracted; delivering the heated solvent into the extraction chamber; pumping at least some of the solvent out of the extraction chamber with the recovery pump; delivering the oil and fat extracted in the extraction chamber to the oil-collecting chamber; pumping solvent out of the oil-collecting chamber with the recovery pump; and delivering the solvent received by the recovery pump to the first jacket and the second jacket. Additionally, the method may comprise delivering the solvent from the first and second jackets to the solvent storage tank to again be delivered to the extraction chamber.

These and other important aspects of the present invention are described more fully in the detailed description below.

BRIEF DESCRIPTION OF THE DRAWINGS

Embodiments of the present invention are described in detail below with reference to the attached drawing figures, wherein.

The drawing figure does not limit the present invention to the specific embodiments disclosed and described herein. The drawing is not necessarily to scale, emphasis instead being placed upon clearly illustrating the principles of the invention.

DETAILED DESCRIPTION

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

Figure 1:
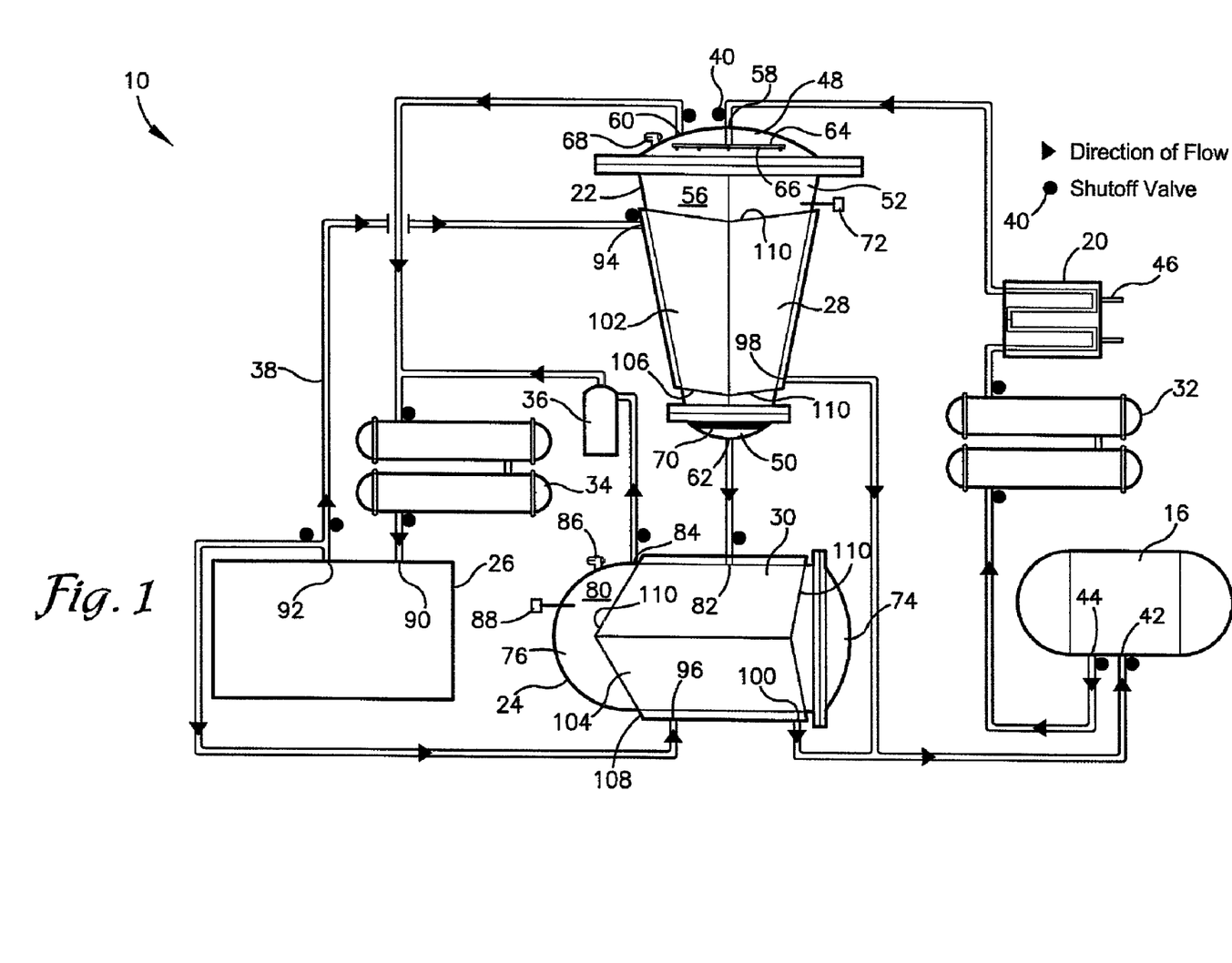
FIG. 1 is a schematic diagram of an oil-extracting apparatus constructed in accordance with an embodiment of the present invention.
Figure 2:
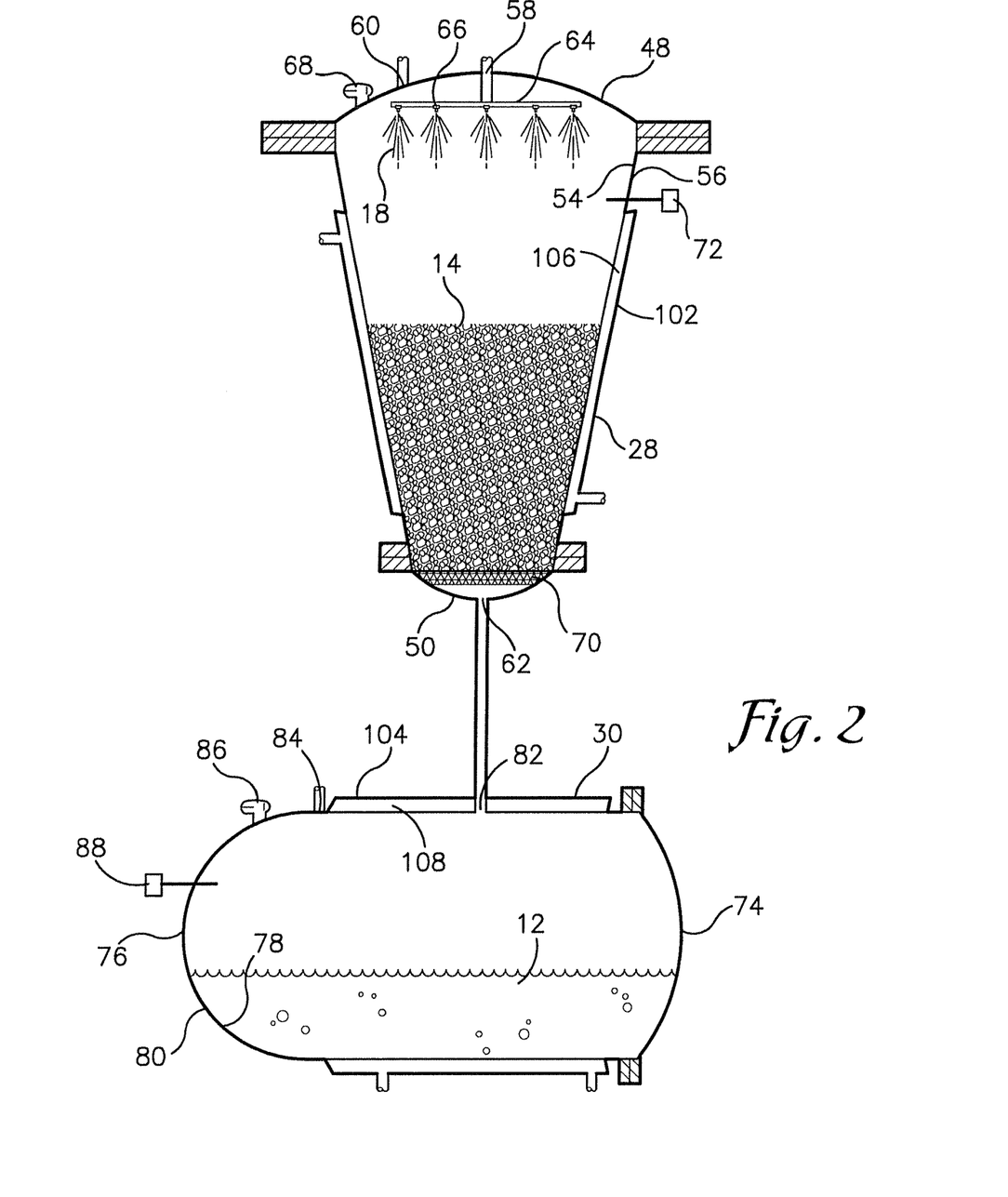
FIG. 2 is a cross-sectional schematic diagram of an extraction chamber and oil-collecting chamber of the apparatus of FIG. 1.
Figure 3:
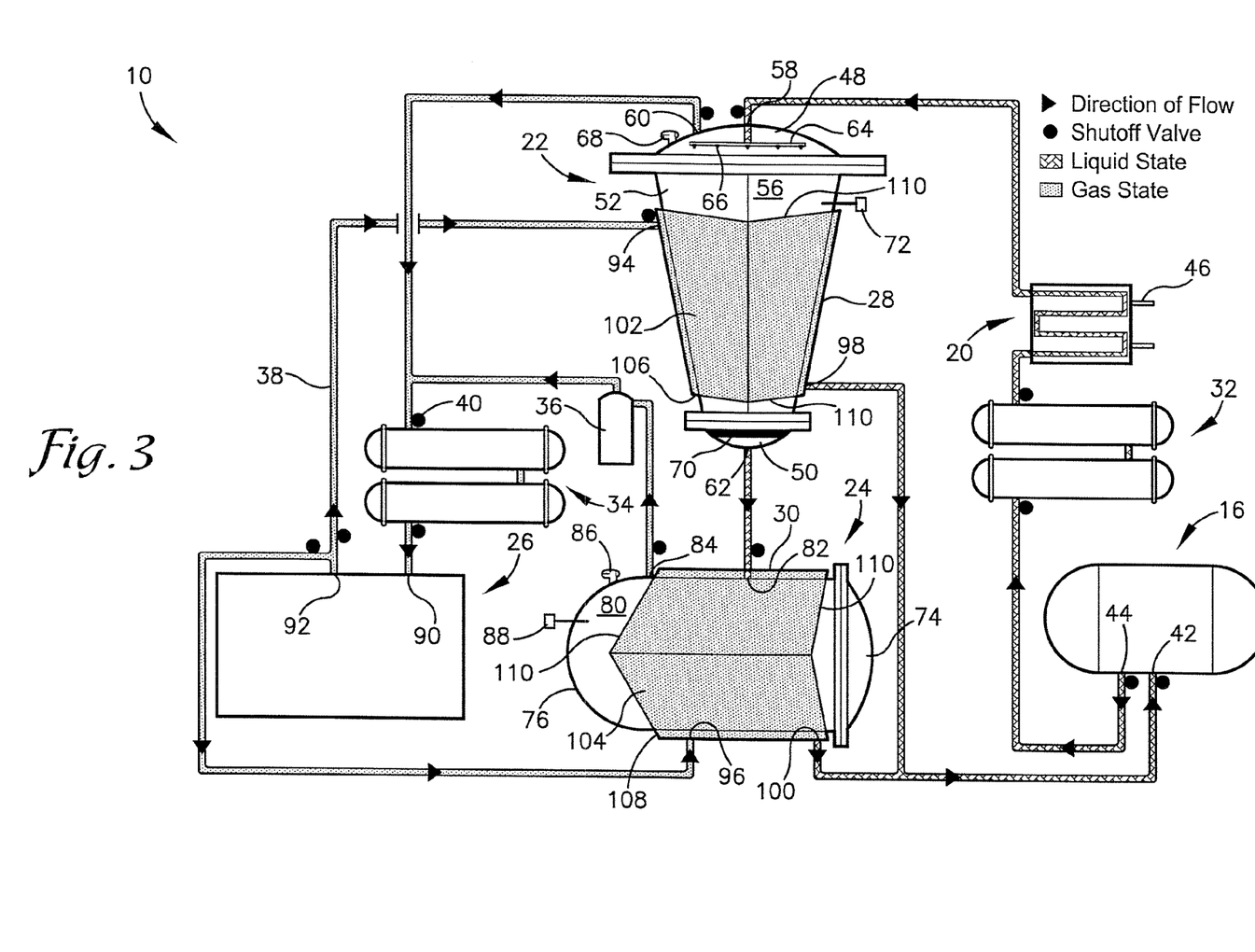
FIG. 3 is a schematic diagram of the oil-extracting apparatus of FIG. 1 illustrating the states of matter at various points within the apparatus.

FIGS. 1-3 illustrate an oil and fat extraction apparatus 10 for extracting oil and fat 12 from an oil-bearing substance 14. The oil-bearing substance 14 may be any substance, substances, or combination of substances occurring synthetically or naturally that contain oil and/or fat. For example, the oil-bearing substance 14 may be any biomass such as seeds, grain, grass, bark, animal byproducts, etc., or it may be rubbers, plastics, minerals, dirt, etc. Additionally, the oil-bearing substance 14 may be any combination of a plurality of oil or fat-bearing substances.

The apparatus 10 may comprise a solvent storage tank 16 for holding a solvent 18, a heat exchanger 20, an extraction chamber 22, an oil-collecting chamber 24, a recovery pump 26, a first jacket 28 and a second jacket 30 for providing heat to the extraction chamber 22 and the oil-collecting chamber 24, filters 32,34,36, and a plurality of pipes 38 and valves 40.

The components of the apparatus 10 may be formed of stainless steel or any other sufficiently rigid, durable material.

The solvent storage tank 16 may be of any size, shape, and configuration to store a desired amount of solvent for removing oil and fat 12 from the oil-bearing substance 14. The solvent 18 may be any solvent with a boiling point sufficiently lower than most oils and fats 12. In various embodiments of the invention, the solvent 18 may have a boiling point at a room temperature from between 35 to 200 degrees Fahrenheit. For example, the solvent 18 may have a boiling point at room temperature or approximately 80 degrees Fahrenheit at a sufficiently low pressure within the chambers 22,24. In one embodiment of the invention, the solvent 18 may be a mixture of isobutane, propane, and N-butane. For example, the solvent may contain 33% isobutane, 0.5% propane, and 66.5% N-butane. However, other solvents for dissolving fat and oil from oil-bearing substances may be used.

The solvent storage tank 16 may comprise an input 42, an output 44, and a bleed valve (not shown) for releasing any oxygen therein. In some embodiments of the invention, the solvent storage tank may comprise or be coupled to one or more auxiliary pumps (not shown) for assisting in the flow of solvent through the apparatus. However, the auxiliary pump is not required for the apparatus 10 to operate.

The heat exchanger 20 may comprise a heat source 46 for increasing the temperature of the solvent 18 to a temperature ideal for facilitating a low-temperature vacuum boil of the solvent within the extraction chamber 22. This temperature may be, for example, slightly less than a boiling point of the solvent 18. Note that the boiling point of the solvent 18 is related to the pressure that the solvent 18 is under. The heat source 46 may be anything that radiates heat sufficient to heat the solvent 18. For example, heat may be provided to the heat exchanger 20 as hot water, steam, vapor, or other non-combustible means to heat the solvent 18.

The extraction chamber 22 may have a top portion 48, a bottom portion 50, and at least one side portion 52 defining a pre-determined volume of enclosed space therebetween. The extraction chamber top, bottom, and side portions 48-52 also may comprise at least one inner wall portion 54 and at least one outer wall portion 56. The extraction chamber 22 may contain the oil-bearing substance 14.

Additionally, the extraction chamber 22 may comprise an input 58, a solvent recovery output 60, and an oil output 62. The input 58 of the extraction chamber 22 may comprise a spray apparatus 64 for distributing the solvent 18 into the extraction chamber 22, and the spray apparatus 64 may further comprise nozzles 66, such as venturi nozzles. The solvent recovery output 60 is connected by one of the plurality of pipes 38 to the recovery pump 26, such that the recovery pump 26 may provide vacuum or suction force for lowering the pressure in the extraction chamber 22 to provide the proper conditions for a low-temperature vacuum boil of the solvent 18 within the extraction chamber 22. Additionally, the vacuum or suction force may also remove at least a portion of solvent 18 in vapor form from the extraction chamber 22 through the solvent recovery output 60. The oil output 62 allows for oil and fat to exit the extraction chamber 22.

The extraction chamber 22 may have a funnel-like shape, with a volume decreasing from the top portion 48 to the bottom portion 50, though other shapes may be used. The funnel-like shape may assist in gathering oil and fat 12 in the bottom portion 50 for collection and may prevent a phenomenon called "channeling" that may hinder complete extraction of all materials in the extraction chamber 22. Furthermore, a funnel shape has been discovered to be beneficial in the creation of the low-temperature gas boil of the solvent 18 in the extraction chamber 22.

The extraction chamber 22 may further comprise a first safety relief valve 68 for releasing at least a portion of the contents within the extraction chamber 22 if the amount of contents or pressure inside of the extraction chamber 22 becomes too great. Additionally, the extraction chamber 22 may comprise an extraction filter 70 at the bottom portion 50 which filters out/separates at least a portion of water, moisture, and/or solvent from the oil and fat 12 prior to exiting the extraction chamber 22 through the oil output 62. The extraction filter 70 may comprise molecular sieves or any other suitable filtering substance or device.

In various embodiments of the invention, a first sensor 72 may signal when the extraction chamber 22 is full of the oil-bearing substance 14 and/or the solvent 18. For example, the first sensor 72 may be a tuning fork configured to experience a change in vibration when the extraction chamber 22 is full of the oil-bearing substance 14 and/or the solvent 18, and configured to trigger a stop in the flow of solvent to the extraction chamber 22 when the tuning fork experiences this change in vibration.

In various embodiments of the invention, the extraction chamber 22 may be coupled to a vacuum pump (not shown) for removing the atmosphere within the extraction chamber 22 after the oil-bearing substance 14 is placed therein. For example, the extraction chamber 22 may be vacuumed to 10 microns. This vacuuming of the extraction chamber 22 may also occur following completion of oil and fat extraction by the apparatus 10, such that the extraction chamber 22 may be fulling emptied before another oil-bearing substance 14 is placed in the extraction chamber 22.

The vacuum or suction force of the recovery pump 26 during the extraction process, as described herein, may decrease the pressure within the extraction chamber 22, allowing the solvent 18 to experience a low-temperature vacuum boil. For example, the recovery pump 26 may keep pressure within the extraction chamber 22 from growing past 250 lbs per square inch. By lowering the pressure in the extraction chamber 22, the temperature at which solvent in the extraction chamber 22 boils is also decreased. For example, the solvent 18 may be heated to approximately 80 degrees Fahrenheit by the heat exchanger 20, which may cause the solvent 18 to begin to boil within the extraction chamber 22 due to the decrease in pressure caused by the recovery pump 26. So, the temperature and pressure within the extraction chamber 22 may cause the low-temperature vacuum boil of the solvent, but may not be sufficient to cause the oil or fat extracted from the oil-bearing substance 14 to boil or heat up to damaging temperatures. This is beneficial, because when oil and/or fat boil, their supercritical turpines may be damaged or destroyed. For example, high temperatures may negatively affect the flavor, olfactory profile, vitamin content, and other heat-sensitive components of various oils and/or fats.

The low-temperature vacuum boil of the solvent 18 may move the oil-bearing substance 14 around to expose new faces of the substance to fresh solvent in order to achieve full oil capture from the substance 14 in a shorter amount of time than prior art extraction methods. Also, the inner wall portions 54 of the extraction chamber 22 may comprise small indentations and/or protrusions which may also allow for vigorous cavitation boiling of the solvent 18 and aid in partial recovery of the solvent 18 in gas form from the extraction chamber 22. Additionally, in some embodiments of the invention, a small stirring prop (not shown) may be used within the extraction chamber 22 to increase surface exposure of the oil-bearing substance 14 in addition to the low-temperature vacuum boil.

The oil-collecting chamber 24 may be configured to receive material discharged from the oil output 62 of the extraction chamber 22, such as the oil and fat 12. The oil-collecting chamber 24 may be any size and shape required for a given application, and may comprise a first end 74, a second end 76, an internal wall portion 78, an external wall portion 80, an input 82, an output 84, and a second safety relief valve 86 for releasing at least a portion of the contents within the oil-collecting chamber 24 if the amount of content or pressure inside of the oil-collecting chamber 24 becomes too great.

The output 84 may serve a function similar to the solvent recover output 60 of the extraction chamber 22, connecting with at least one of the pipes 38 to the recovery pump 26 for lowering the pressure within the oil-collecting chamber 24 and removing at least a portion of the solvent 18 in vapor form from the oil-collecting chamber 24. The internal wall portion 78 may also comprise small indentations and/or protrusions which may allow for vigorous cavitation boiling of the solvent 18 and aid in partial recovery of the solvent 18 in gas form from the oil-collecting chamber.

The oil-collecting chamber 24 may comprise a second sensor 88 for signaling when the oil-collecting chamber 24 is full. For example, the second sensor 88 may be a tuning fork configured to experience a change in vibration when the oil-collecting chamber 24 is full of solvent, oil, and/or fat, and configured to trigger a stop in the flow of oil, fat, and/or solvent into the oil-collecting chamber 24 from the extraction chamber 22 when the tuning fork experiences this change in vibration.

The recovery pump 26 may be of any size and shape required by a particular application and may comprise an input 90 and an output 92. The recovery pump 26 is operable to receive and/or extract the solvent 18 in vapor form from one or both of the solvent recovery output 60 of the extraction chamber 22 and the output 84 of the oil-collecting chamber 24. The solvent 18 may then be pumped out of the recovery pump 26 through the output 92. A power source (not shown) may be required to actuate pumping of the recovery pump 26. The power source may be any power source known in the art that provides sufficient for the recovery pump 26 to operate. The pressure applied to the solvent 18 by the recovery pump 26 may heat the solvent 18, such that the solvent exiting through the output 92 of the recovery pump 26 is hotter than the solvent 18 entering through the input 90 of the recovery pump 26.

The first and second jackets 28,30 each have an input 94,96 for receiving solvent from the recovery pump and an output 98,100 for sending solvent to the solvent storage tank 16. The first and second jackets 28,30 may each comprise an outer layer 102,104 and an inner layer 106,108 configured such that solvent and/or solvent vapor may flow therebetween. For example, the outer layer 102,104 and the inner layer 106,108 may be attached or integral to each other along edge-portions 110 of the inner and outer layers 102-108 to define a space therebetween where the solvent may flow from the inputs 94,96 of the jackets 28,30 to the outputs 98,100 of the jackets 28,30. Furthermore, the jackets 28,30 may contain small indentations or protrusions on the inner and/or outer layers 102-108 of the jackets 28,30 such that the solvent 18 may flow or be distributed evenly throughout the jackets 28,30 between the inner and outer layers 102-108.

The first jacket 28 may be adjacent to and substantially conform to the external shape of at least a portion of the extraction chamber 22. In various embodiments of the invention, the first jacket 28 may wrap around a majority portion of the side walls 52 of the extraction chamber 22. Alternatively, the first jacket 28 may comprise the outer layer 102 but not the inner layer 106, and the edge portions 110 of the outer layer 102 of the first jacket 28 may be sealed against or integral with the outer wall portion 56 of the extraction chamber 22, such that the solvent 18 may flow between the outer wall portion 56 of the extraction chamber 22 and the outer layer 102 of the first jacket 28.

The second jacket 30 may be adjacent to and substantially conform to the external shape of at least a portion of the oil-collecting chamber 24. In various embodiments of the invention, the second jacket 30 may wrap around a majority of the external wall portion 80 of the oil-collecting chamber 24. Alternatively, the second jacket 30 may comprise the outer layer 104 but not the inner layer 108, and the edge portions 110 of the outer layer 104 of the second jacket 30 may be sealed against or integral with the external wall portion 80 of the oil-collecting chamber 24, such that the solvent 18 may flow between the external wall portion 80 of the oil-collecting chamber 24 and the outer layer 104 of the second jacket 30.

The filters 32-36 of the apparatus 10 may comprise a pre-extraction filter 32, a pre-recovery filter 34, and an oil separator 36. The filters may be any filters for filtering the solvent 18. The pre-extraction filter 32 and the pre-recovery filter 32 may comprise a portion of molecular sieves and a portion of activated charcoal in order to filter out any oil, fat, or other impurities in the solvent 18. For example, the pre-extraction and pre-recovery filters 32-34 may comprise 50% activated charcoal and 50% molecular sieves.

The pre-extraction filter 32 may be positioned between the solvent storage tank 16 and the heat exchanger 20 and/or extraction chamber 22, to filter impurities, oil, and fat from the solvent 18 exiting the solvent storage tank 16 before it enters the extraction chamber 22. The pre-recover filter 34 may be positioned between the oil-collecting chamber 24, the extraction chamber 22, and the recovery pump 26 to filter impurities, oil, and fat from the solvent 18 exiting the oil-collecting chamber output 84 and the extraction chamber solvent recovery output 60 before the solvent 18 enters the recovery pump 26.

The oil separator 36 may be positioned between the oil-collecting chamber 24 and the pre-recovery filters 34 and may be operable to swirl the solvent 18 in vapor form exiting the oil-collecting chamber 24 such that any of the oil and/or fat mixed with the solvent vapor will move to the outside of the oil separator 36, where it can then drop back into the oil-collecting chamber 24, while the solvent 18 (which is lighter than the oil and fat 12) continues to be sucked into the pre-recovery filters 34 and the recovery pump 26.

The plurality of pipes 38 may be any conduits through which solvent, fat, and oil comprised in the apparatus 10 may be transferred from the various outputs of the apparatus 10 components to the various inputs of the apparatus 10 components. The plurality of pipes 38 may also each have one or more valves 40 for opening or closing the pipe, thereby either allowing the flow or stopping the flow of oil, fat, solvent, or other substances through the apparatus 10. As mentioned above, certain control means, such as the first and second sensors 72,88, may be coupled with various shutoff valves 40 such that automatic shutoff of particular valves 40 may occur as needed for a particular application.

The direction of flow of the solvent, oil, and fat throughout the pipes 38 of the apparatus 10 is illustrated with arrows in FIGS. 1 and 3. Specifically, the solvent 18 may flow from the solvent storage tank 16 to the pre-extraction filters 32, from the pre-extraction filters 32 to the heat exchanger 20, and from the heat exchanger 20 to the extraction chamber 22. Furthermore, the oil and fat 12 may flow out of the extraction chamber 22 and into the oil-collecting chamber 24.

Solvent vapor may also flow from the solvent recovery output 60 of the extraction chamber 22 and from the output 84 of the oil-collecting chamber 24 to the pre-recovery filters 34, and the solvent 18 may flow from the pre-recovery filters 34 to the recovery pump 26. Alternatively, the solvent 18 may flow from the oil collecting chamber 24 to the oil separator 36, and from the oil separator 32 to the pre-recovery filters 34. Finally, the solvent 18 or solvent vapor may flow from the recovery pump 26 into each of the jackets 28,30, and then from the jackets 28,30 back to the solvent storage tank 16.

FIG. 3 illustrates the various states of matter of the material flowing through the plurality of pipes 38. Specifically, solvent in a liquid state may flow from the solvent storage tank 16 to the pre-extraction filters 32 and then to the heat exchanger 20. The heat exchanger 20 may heat the solvent 18, which subsequently may be delivered to the extraction chamber 22 as a heated liquid. Within the extraction chamber 22, the solvent 18 may experience a low-temperature vacuum boil. The oil and fat 12 that flows from the extraction chamber 22 into the oil-collecting chamber 24 may be in a liquid state. The solvent 18 flowing from the extraction chamber 22 to the pre-recovery filters 34 and from the oil-collecting chamber 24 to the oil separator 36 and then to the pre-recovery filters 34 may be in a vapor gas state. The solvent 18 flowing from the pre-recovery filters 34 into the recovery pump 26 may also be in a vapor gas state.

The solvent 18 in the recovery pump 26 is compressed/heated, such that the solvent 18 exiting the recovery pump 26 may be in a compressed/heated gas state as it flows into the jackets 28,30. As the solvent 18 flows through the jackets 28,30, the heat is transferred to the extraction and oil-collecting chambers 22,24, and the solvent 18 flowing out of the jackets 28,30 into the solvent storage tank 16 may be in a liquid state.

Figure 4:
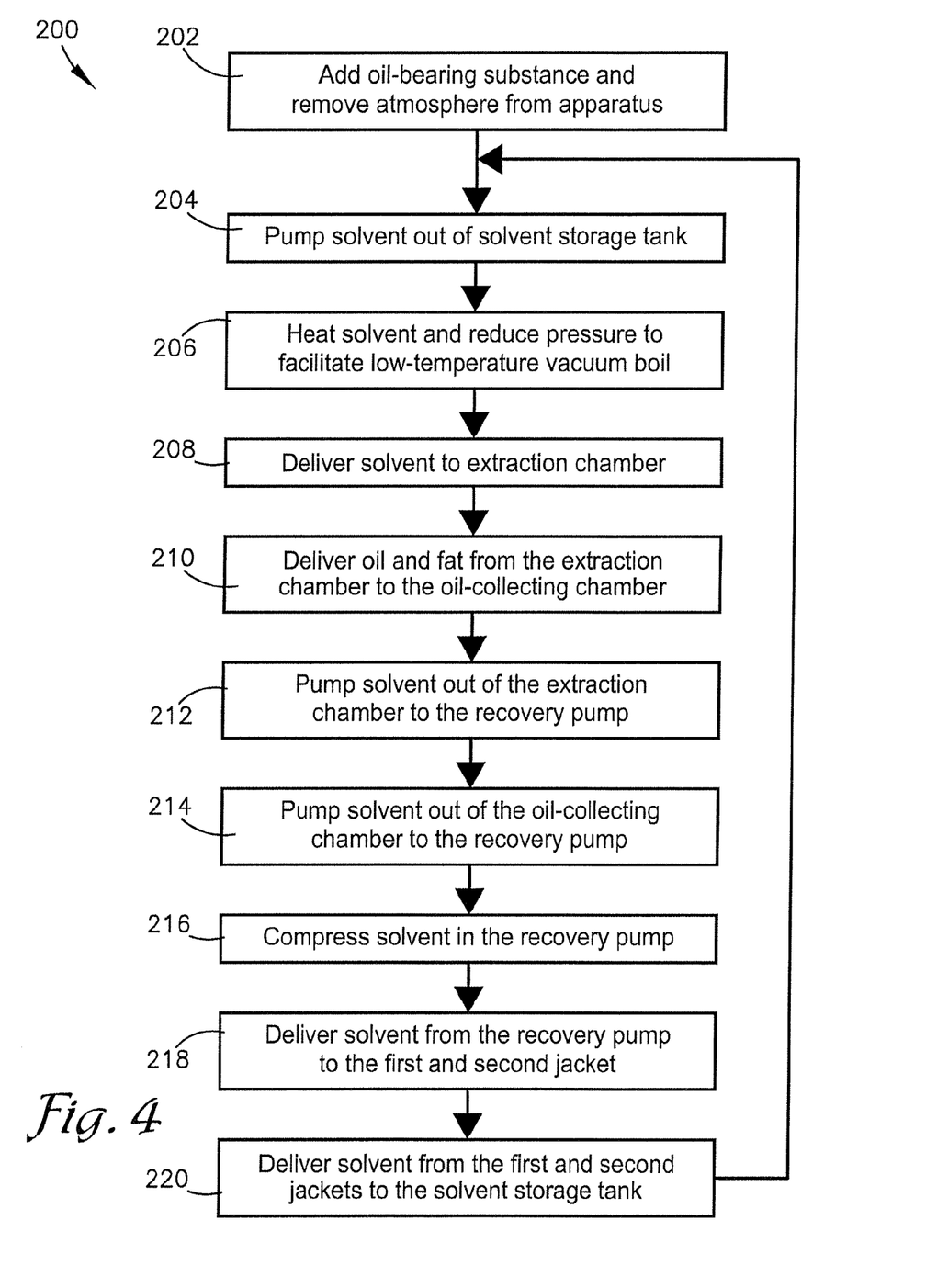
FIG. 4 is a flow diagram of a method for extracting oil and/or fat from an oil-bearing substance using the apparatus of FIG. 1.

FIG. 4 illustrates some of the steps in an exemplary method 200 of extracting oil and fat from the oil-bearing substance using the apparatus 10 described above. First, the oil-bearing substance 14 may be inserted into the extraction chamber 22, the extraction apparatus 10 may be sealed air-tight, and at least a portion of atmosphere may be removed from the apparatus 10 by vacuum force, as depicted in step 202. Then the solvent 18 may be delivered into the extraction chamber 22 through the input 58 of the extraction chamber 22. Specifically, the solvent 18 may be pumped from the solvent storage tank 16, as depicted in step 204, through the pre-extraction filters 32, heated by the heat exchanger 20, as depicted in step 206, and then pumped into the extraction chamber 22, as depicted in step 208.

The heated solvent may be pumped into the extraction chamber 22 continuously by force from the recovery pump 26 and/or with the assistance of the one or more auxiliary pumps (not shown), until a full oil and/or fat yield is achieved or until the extraction chamber 22 becomes too full, at which point the first sensor 72 may trigger the actuation of one of the valves 40 in order to stop the flow of solvent into the extraction chamber 22. The heated solvent in the extraction chamber 22 may boil due to the low pressure and the heat from the heat exchanger 20 and from the first jacket 28. The recovery pump 26 may lower the pressure within the extraction chamber 22, therefore allowing the solvent to boil at a low temperature, as described above. This low-temperature vacuum boil may move the oil-bearing substance 14 around to expose new faces of the substance 14 to fresh solvent in order to achieve full oil capture from the substance 14 in a shorter time and a fuller yield than prior art methods.

As the solvent 18 removes the oil and fat 12 from the oil-bearing substance 14, the oil and fat 12 may fall to the bottom portion 50 of the extraction chamber 22 and pass through the extraction filter 70 and into the oil-collecting chamber 24, as depicted in step 210. Solvent in a vapor and/or gas form may be pumped out from both the extraction chamber 22, as depicted in step 212, and the oil-collecting chamber 24, as depicted in step 214, by the recovery pump 26. As discussed above, the oil separator 36 and the pre-recovery filters 34 may be used to separate the oil and fat 12 from the solvent 18 and to keep most or all of the oil and fat 12 in the oil-collecting chamber 24. The compression of the solvent 18 (in gas form) in the recovery pump 26 may thereby heat the solvent 18, as depicted in step 216. As the process nears completion and less solution 18 in gas form is recovered, less heat will be generated by compression of the solvent 18 in the recovery pump 26, therefore generating less heat to be pumped into the jackets 28,30.

As depicted in step 218, the solvent 18 from the recovery pump 26 may be directed into the jackets 28,30 to heat the extraction chamber 22 and oil-collecting chamber 24 in order to keep the chambers 22,24 heated to keep the solvent 18 boiling so that the solvent 18 can be removed from the oil and fat 12 extracted by the apparatus 10. The jackets 28,30 allow the heat lost during solvent recovery to be recycled by using compression-heated solvent 18 from the recovery pump 26 to provide heat to the chambers 22,24. From the jackets 28,30, the solvent 18 may be directed back into the solvent storage tank 16 for re-use, as depicted in step 220.

When the oil-collecting chamber 24 is full, the second sensor 88 may trigger various ones of the valves 40 to close such that no additional oil, fat, or solvent may pass into the oil-collecting chamber 24. The remaining oil-bearing substance 14 in the extraction chamber 22, after its oil and fat 12 have been extracted, may be emptied from the extraction chamber 22. Additionally, to insure that all material is removed from the extraction chamber 22 after the extraction process is complete, a vacuum force may be used. For example, the extraction chamber 22 may be vacuumed to 10 microns.

Figure 5:
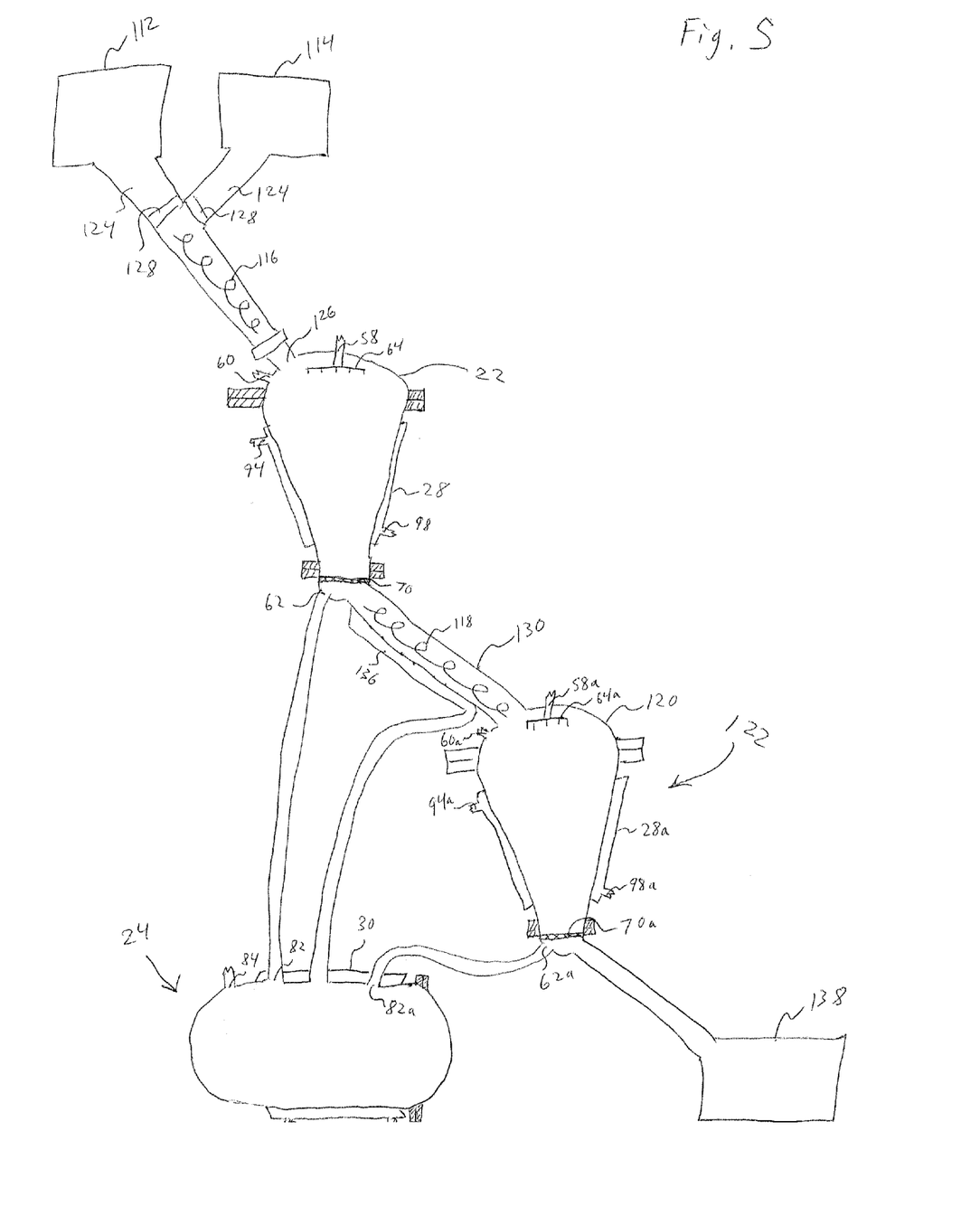
FIG. 5 is a fragmentary, cross-sectional schematic diagram of an alternative embodiment of the oil-extracting apparatus.
Figure 6:
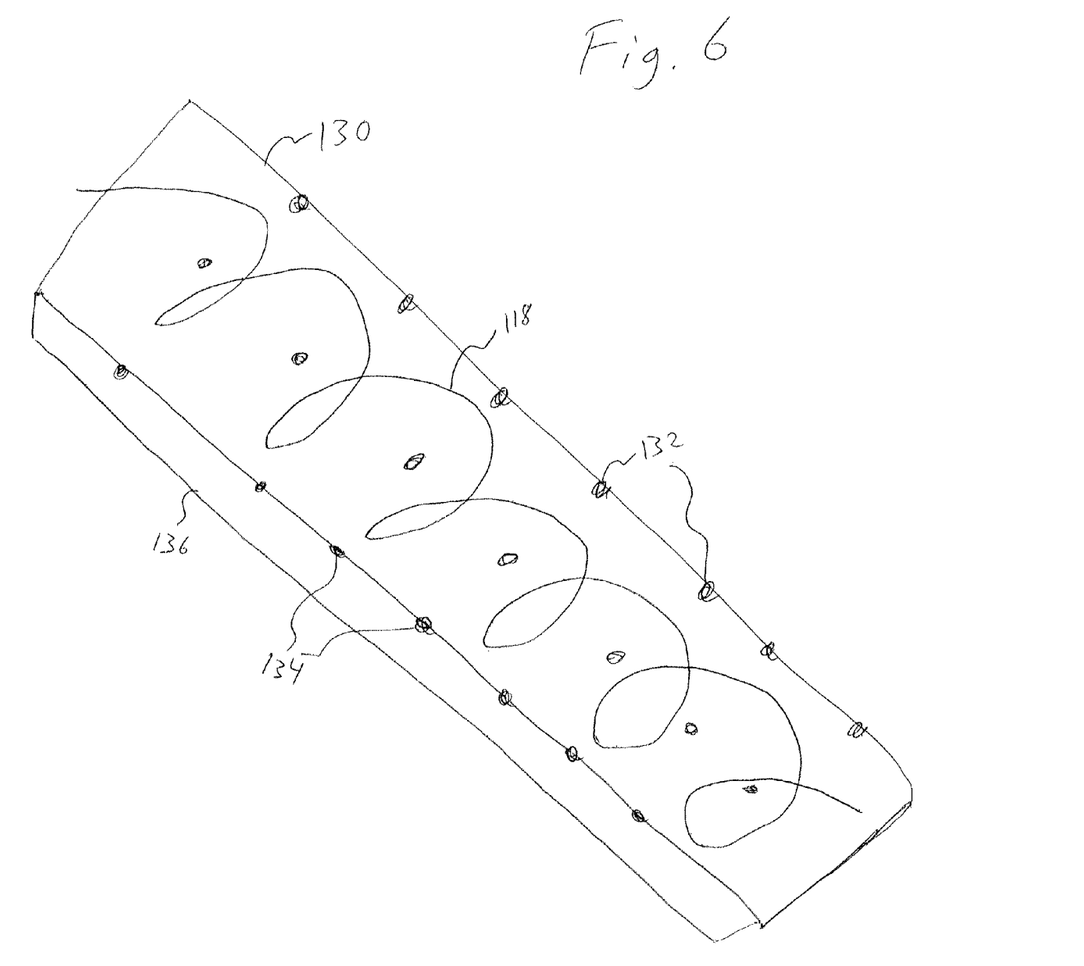
FIG. 6 is a cross-sectional schematic diagram of an auger conduit of FIG. 5.
Figure 7:
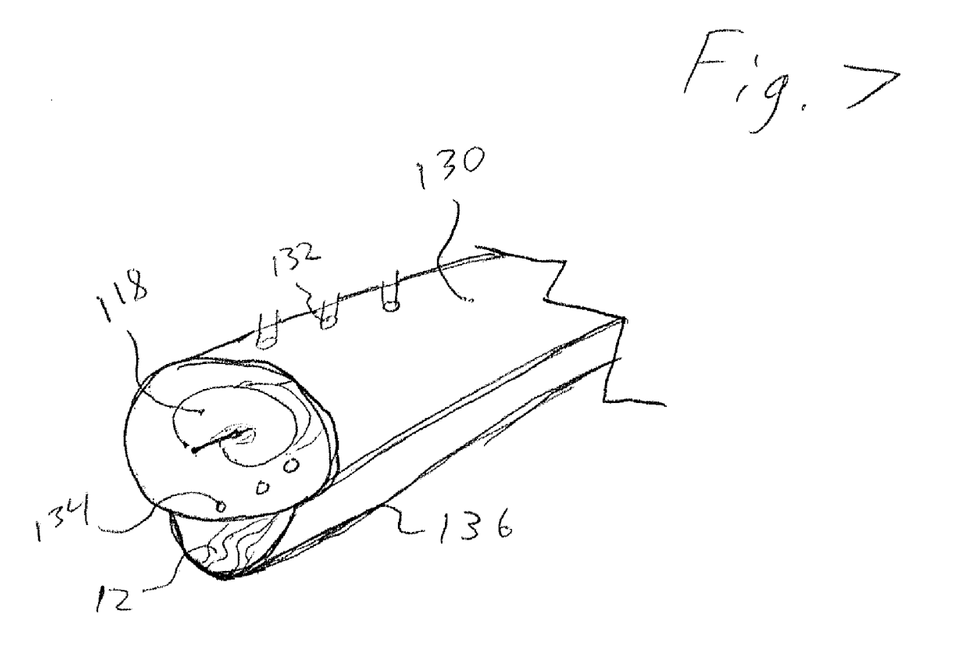
FIG. 7 is a fragmentary perspective view of the auger conduit of FIG. 5.

In an alternative embodiment of the invention, illustrated in FIGS. 5-7, the apparatus may operate substantially continuously using one or more hoppers 112,114 and augers 116,118 for feeding the oil-bearing substance 14 bathed in solvent 18 to the extraction chamber 22 and for feeding the remaining oil-bearing substance 14, after its oil and fat 12 have been extracted, out of the extraction chamber 22 and into a supplemental extraction chamber 120 of a supplemental apparatus 122. The supplemental apparatus 122 is only partially illustrated herein, but may have similar or identical components to and operate in substantially the same manner as the apparatus 10, thereby allowing for additional extraction of oil and fat 12 from the oil-bearing substance 14.

For example, the supplemental apparatus 122 may comprise a first jacket 28a having an input 94a and an output 98a, the supplemental extraction chamber 120 having an input 58a, an oil output 62a, a solvent recovery output 60a, a spray apparatus 64a, and an extraction filter 70a, among other components. In various embodiments, the supplemental extraction chamber 120 may empty its oil and fat 14 into the same oil-collecting chamber 24 as used by the extraction chamber 22. For example, oil and fat exiting through oil output 62a may travel into the oil-collecting chamber 24 through opening 82a. Other various components of the apparatus 10 may be integrated for use by both the apparatus 10 and the supplemental apparatus 122.

The hoppers 112,114 may each be connected by one or more airtight conduits 124 to an oil-bearing substance opening 126 in the extraction chamber 22. Each hopper 112,114 may empty its contents, such as the oil-bearing substance bathed in solvent, into the extraction chamber 22 by the opening and closing of one or more hopper valves 128. Prior to the opening of a hopper's valve 128, the hopper 112 or 114 may be vacuumed such that its internal pressure matches that of the extraction chamber 22. In this way, one of the hoppers 112 may be in the process of being filled with the solvent 18 and the oil-bearing substance 14 and vacuumed, while the other hopper 114 has its valve 128 in an open position and is in the process of emptying its contents into the extraction chamber. This process may operate semi-continuously, with each of the valves 128 alternating between the open and closed positions at different times from the other valve 128.

As discussed above, one of the augers 116 may feed the oil-bearing substance 14 bathed in solvent 18 to the extraction chamber 22. Another of the augers 118 may feed what remains of the oil-bearing substance 14 after a desired yield of the oil and fat 12 have been extracted from the oil-bearing substance 14 out of the extraction chamber 22. As illustrated in FIGS. 5-7, the auger 118 may be centered in an auger conduit 130 having a plurality of nozzles 132 and a plurality of drains 134, wherein the nozzles 132 may add additional solvent 18 to the oil-bearing substance 14 being fed by the auger 118. Furthermore, the drains 134 may be used to release any additional oil and/or fat dissolved by the additional solvent 18 into an oil-catcher portion 136 of the auger conduit 130, which may then direct the oil and/or fat that it receives into the oil-collecting chamber 24. A mesh and/or other types of filters, including molecular sieves, may be used to filter any of water, moisture, and/or solvent from the oil and/or fat that is filtered into the oil-catcher portion 136 of the auger conduit 130.

Once the oil-bearing substance 14 exits the auger conduit 130, it may enter into a storage unit 138 or into the supplemental extraction chamber 120 of the supplemental apparatus 122, and then eventually enter into the storage unit 138. The supplemental apparatus 122 also delivers oil and fat to the oil-collecting chamber 24 and may allow for a higher oil and/or fat yield.

Although the invention has been described with reference to the preferred embodiments illustrated in the attached drawings, it is noted that equivalents may be employed and substitutions made herein without departing from the scope of the invention as recited in the claims. For example, additional filters may be utilized within the apparatus 10, or the filters may be placed in a different location relative to the other components of the apparatus 10. Additionally, the apparatus 10 may comprise various openings and/or hatches not referenced herein to provide access to inner portions of the components of the apparatus 10. Finally, the pipes, conduits, inputs, and outputs described herein may have different positions or configurations than illustrated herein or follow different paths to a destination without departing from the scope of this invention.

Having thus described the preferred embodiment of the invention, what is claimed as new and desired to be protected by Letters Patent includes the following:

1. An apparatus for extracting at least one of oil and fat from oil-bearing substances, the apparatus comprising:
   an extraction chamber comprising a top portion and a bottom portion, containing an oil-bearing substance, and configured for receiving a solvent and facilitating a low-temperature vacuum boil of the solvent within the extraction chamber;

an oil-collecting chamber configured for receiving at least one of oil and fat from the extraction chamber;

a recovery pump configured for extracting solvent in vapor form from at least one of the extraction chamber and the oil-collecting chamber; and at least one of a first jacket adjacent at least a portion of the extraction chamber and a second jacket adjacent at least a portion of the oil-collecting chamber, the first jacket and the second jacket being configured to receive solvent compressed by the recovery pump.

2. The apparatus of claim 1, further comprising filters configured to remove impurities from the solvent at least one of before entering the extraction chamber or after exiting the extraction chamber.

3. The apparatus of claim 1, further comprising a solvent storage tank configured to receive solvent from at least one of the first jacket and the second jacket, and configured to output solvent to the extraction chamber.

4. The apparatus of claim 1, further comprising an oil separator configured to allow solvent from the oil-collecting chamber to flow therethrough prior to entering the recovery pump and operable to separate the oil from the solvent.

5. The apparatus of claim 1, further comprising a plurality of pipes for transporting at least one of oil, fat, and solvent to and from various components of the apparatus.

6. The apparatus of claim 1, further comprising a heat source configured to heat the solvent, before it enters the extraction chamber, to a temperature high enough to facilitate the low-temperature vacuum boil of the solvent when it enters the extraction chamber, but not high enough to cause oil and fat to boil.

7. The apparatus of claim 1, further comprising a tuning fork configured to experience a change in vibration when the extraction chamber is full of solvent, and configured to trigger a stop in the flow of solvent to the extraction chamber when the tuning fork experiences said change in vibration.

8. The apparatus of claim 1, further comprising a tuning fork configured to experience a change in vibration when the oil-collecting chamber is full of at least one of oil and fat, and configured to trigger a stop in the flow of at least one of oil, fat, and solvent into the oil-collecting chamber when the tuning fork experiences said change in vibration.

9. The apparatus of claim 1, wherein the extraction chamber has a funnel-like shape, with a volume that gradually decreases from the top portion of the extraction chamber to the bottom portion of the extraction chamber.

10. The apparatus of claim 1, wherein the extraction chamber further comprises a filter proximate the bottom portion of the extraction chamber and configured to filter out at least one of water and solvent and to allow oil and fat to pass through.

11. The apparatus of claim 1, further comprising an auger for delivering the oil bearing substances from the extraction chamber, once an oil extraction process has been completed by the extraction chamber, to one of a storage unit and a supplemental extraction chamber for extracting any remaining oil and fat from the oil bearing substances.

12. The apparatus of claim 1, further comprising a first hopper having a first valve and configured for dispensing the oil bearing substances into the extraction chamber when the first valve is open, and a second hopper having a second valve and configured for dispensing the oil bearing substances into the extraction chamber when the second valve is open, wherein when either of the valves are closed, the corresponding hopper is filled with an oil bearing substance and vacuumed such that an internal pressure of the hopper matches a pressure within the extraction chamber to maintain the pressure in the extraction chamber once the valve is opened.

13. The apparatus of claim 12, wherein the first valve and the second valve are alternately opened such that while the first hopper is being filled with the oil bearing substance, the second hopper is dispensing the oil bearing substance into the extraction chamber.

14. The apparatus of claim 11, wherein the auger is housed in an auger conduit comprising nozzles, drains, and an oil-catcher portion, such that solvent may be sprayed through the nozzles into the auger conduit and oil and fat may drain into the oil catcher through the drains as the auger delivers the oil bearing substance.

15. An apparatus for extracting at least one of oil and fat from oil-bearing substances using a solvent, the apparatus comprising:

an extraction chamber comprising a top portion and a bottom portion, containing an oil-bearing substance, and configured for receiving the solvent;

a heat exchanger configured to heat the solvent to a temperature high enough to facilitate a low-temperature vacuum boil of the solvent, but less than the boiling point of the oil and fat;

an oil-collecting chamber configured for receiving at least one of oil and fat from the extraction chamber;

a recovery pump configured for extracting solvent in a vapor form from at least one of the extraction chamber and the oil-collecting chamber by suction force;

at least one of a first jacket adjacent at least a portion of the extraction chamber and a second jacket adjacent at least a portion of the oil-collecting chamber, the first jacket and the second jacket being configured to receive solvent heated by compression within the recovery pump and configured to provide heat from the solvent to at least one of the extraction chamber and the oil-collecting chamber; and a solvent storage tank configured for receiving the solvent from at least one of the first and the second jackets and configured for delivering the solvent to at least one of the heat exchanger and the extraction chamber.

* * * * *